Patented Mar. 2, 1954

2,671,069

UNITED STATES PATENT OFFICE 2,671,069

GAMMA ALUMINA FILLED SILICONE RUBBER

Richard M. Savage, Colonie, N. Y., assignor to General Electric Company, a corporation of New York No Drawing. Application June 24, 1952, Serial No. 295,339

8 Claims. (Cl. 260—37)

This invention is concerned with silicone rubber compositions having improved heat resistance. More particularly, the invention relates to a composition of matter comprising an organopolysiloxane convertible to the solid elastic state and a filler therefor comprising gamma alumina. The invention also includes within its scope cured or vulcanized products containing the aforesaid gamma alumina as a filler.

One of the few reinforcing agents known for organopolysiloxanes convertible to the solid elastic state by the use of heat or curing agents, or both, is silica aerogel. The latter material when used as a filler for the convertible organopolysiloxane imparts tensile and elongation properties greater than has heretofore been possible by the usual non-reinforcing filler, such as, for example, titanium dioxide, etc. One disadvantage in using silica aerogel has been the fact that the heat resistance of the filled cured product, although as high as usual organopolysiloxane compositions generally are known to be, nevertheless when subjected to temperatures of, for instance, 250° C. for times of the order of about 16 to 24 hours, tend to become brittle and eventually decompose and disintegrate. In addition, the electrical properties of cured silicone rubber filled with silica aerogel are lower than is desired in many instances due to the fact that the moisture pickup of such filled compositions is undesirably high because of the particular filler used.

I have now discovered that another metallic oxide can be used as filler for convertible organopolysiloxanes and that when so used as a filler, the latter imparts reinforcing properties to the convertible organopolysiloxane so that vulcanized or cured products therefrom have properties which are at least equal to or greater than the same properties of convertible organopolysiloxanes employing silica aerogel as a filler. In addition to the foregoing, unexpectedly it has been found that the tear strength and heat resistance of the filled products obtained in accordance with my invention are exceptionally good and markedly superior to the tear strength and heat resistance properties of organopolysiloxanes employing silica aerogel as a filler. Finally, it has also been found that the electrical properties of materials prepared in accordance with my invention are better and the moisture pickup lower than has heretofore been possible using silica aerogel as a filler.

The convertible silicone compositions hereindescribed, which may be highly viscous masses or gummy elastic solids depending on the state of condensation, the condensing agent employed, the starting organopolysiloxane used to make the convertible organopolysiloxane, etc., will hereinafter be referred to as "convertible organopolysiloxane" or more specifically as "convertible methylpolysiloxane" and "convertible methyl and phenyl polysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756 and Sprung et al. Patent 2,448,556, both issued September 7, 1948, Sprung Patent 2,484,595 issued October 11, 1949, Krieble et al. Patent 2,457,688 issued December 28, 1948, Hyde Patent 2,490,357 issued December 6, 1949, Marsden Patent 2,521,528 issued September 5, 1950, and Warrick Patent 2,541,137 issued February 13, 1951.

It will of course be understood by those skilled in the art that other convertible organopolysiloxanes containing the same or different silicon-bonded organic substituents (e. g., methyl, ethyl, propyl, phenyl, tolyl, xylyl, benzyl, phenylethyl naphthyl, chlorophenyl, both methyl and phenyl, etc., radicals), connected to silicon atoms by carbonsilicon linkages, may be employed without departing from the scope of the invention.

The particular convertible organopolysiloxane used is not critical and may be any one of those described in the foregoing patents, which are generally obtained by condensation of a liquid organopolysiloxane containing an average of from about 1.95, preferably from about 1.98, to about 2.25 organic groups per silicon atom. The usual condensing agents which may be employed and which are well known in the art may include, for instance, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, up to 2 mol percent copolymerized monoorganosiloxane, for example, copolymerized monomethylsiloxane. Generally, I prefer to use as the starting liquid organopolysiloxane from which the convertible, for example, heat-convertible organopolysiloxane is prepared, one which contains about 1.999 to 2.01, inclusive, organic groups, for example, methyl groups per silicon atom, and where more than about 80 percent, preferably more than 90 per cent, of the silicon atoms in the polysiloxane contain two silicon-bonded alkyl groups.

The starting organopolysiloxanes used to make the convertible organopolysiloxanes by condensation thereof preferably comprise organic substituents consisting essentially of monovalent organic radicals attached to silicon through carbon-silicon linkages, there being on the average between 1.95 and 2.25 organic radicals per silicon atom, and in which the siloxane units consist of units of the structural formula $R_2SiO$, where R is preferably a radical of the group consisting of methyl and phenyl radicals. At least 90 percent of the total number of R groups are preferably methyl radicals. The polysiloxane may be one in which all of the siloxane units are $(CH_3)_2SiO$, or the siloxane may be a copolymer of dimethylsiloxane and a minor amount (e. g., from 1 to 20 or more mol percent) of any of the following units alone or in combination therewith:

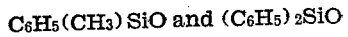

$C_6H_5(CH_3)SiO$ and $(C_6H_5)_2SiO$

A small amount of a cure accelerator, for instance, benzoyl peroxide, tertiary butyl perbenzoate, zirconyl nitrate, etc., may be incorporated into the convertible organopolysiloxane for the purpose of effecting its cure, as is more particularly described in various patents calling for the use of these materials as curing agents for silicone rubber.

The curing agents function to yield cured products having better properties, for instance, improved elasticity, tensile strength and tear resistance, than is obtained by curing a similar gum composition or convertible organopolysiloxane containing no curing agent. The amount of curing agent which may be used may be varied, for example, from about 0.1 to about 8 percent or more, preferably from about 2 to 6 percent, by weight, based on the weight of the convertible organopolysiloxane.

The particular filler employed in the practice of the invention comprises a low temperature gamma alumina ($Al_2O_3$), having a certain crystalline structure and prepared in such a way that it is different from most of the common aluminum oxides presently available. One method of preparing the gamma alumina is to vaporize the anhydrous aluminum chloride by heating it, the said heating being carried out with, e. g., natural gas. The water formed as a result of the combustion hydrolyzes the aluminum chloride in the vapor state, which at a temperature of around 500° F. (which characterizes the low temperature designation of the gamma alumina) dehydrates and converts to a fine particle size gamma aluminum oxide which is then collected and freed of excess hydrogen chloride. The average particle size of this particular alumina (as shown by agreement between electron microscope examination and nitrogen adsorption methods) is very small and is for the most part less than about 100 millimicrons in size, average particle size being from about 20 to 40 millimicrons. The particles are generally of uniform size and shape and the surface area of the gamma alumina is within the range of from about 40 to 130 square meters per gram. Another method for making this gamma alumina is to vaporize anhydrous aluminum chloride and hydrolyze it in the vapor state with high temperature steam, whereby again the actual hydrolysis takes place preferably at around 500° F. There is another alumina similar in many respects to the gamma alumina, namely, alpha alumina, which is not equivalent to gamma alumina as a filler for silicone rubber as will be apparent from the examples below. The gamma alumina, having a hazy X-ray gamma structure, undergoes a change to a sharp gamma structure as the temperature is raised progressively up to around 900° C., where a transition to a sharp alpha pattern takes place. More detailed information regarding gamma alumina may be found disclosed in the article by M. H. Jellinek and I. Fankuchen "X-ray diffraction examination of gamma alumina" in Industrial and Engineering Chemistry, page 158, February, 1945.

The fact that the gamma alumina filler gave the properties referred to above in combination with silicone rubber was entirely unexpected and in no way could have been predicted since the use of other aluminum oxides, including alpha alumina, some of which have been disclosed previously as useful for filling silicone rubber, gave properties inferior to those obtained by means of the use of the gamma alumina.

In order that those skilled in the art may better understand how the present invention may be practiced, the following examples are given by way of illustration and not by way of limitation. All parts are by weight. For comparison, results are given in which other aluminum oxides in various states, in addition to the gamma aluminum oxide, were formulated and tested in essentially the same way as were the formulations containing the gamma alumina as filler.

EXAMPLE 1

A highly viscous convertible organopolysiloxane, specifically polymeric dimethylsiloxane, was prepared by condensing at a temperature of about 150° C. for about six hours, octamethylcyclotetrasiloxane with about 0.01 percent, by weight, thereof potassium hydroxide. This polymer was soluble in benzene and had slight flow at room temperature. This convertible polymeric dimethylsiloxane, which for brevity will be referred to hereinafter as "polydimethylsiloxane," was then mixed on a rubber compounding mill (having differential rolls) with varying amounts of gamma alumina, specifically one identified as Alon I, manufactured by the Godfrey L. Cabot, Inc. of Boston, Massachusetts. Benzoyl peroxide was employed as a curing agent for the convertible organopolysiloxane containing the gamma alumina. As a control, a formulation containing silica aerogel, a reinforcing filler which is commonly employed for making cured silicone rubber, was also prepared using benzoyl peroxide as the curing agent. Table I below shows the ingredients and weight of ingredients employed in each case, together with the properties of the products under various conditions of cure and test. In molding the samples, which were molded in the form of flat sheets, the cycle was carried out at about 255° F. for about 15 minutes at a mold pressure of approximately 500 p. s. i. Thereafter, the samples were removed from the mold and further heat-treated at a temperature of about 300° F. for 1 hour, and then at 480° F. for about 24 hours in an air-circulating oven. Zinc oxide has been found effective for imparting improved properties in the silicone rubber filled with the gamma alumina and some of the samples in Table I include zinc oxide. Silica aerogel-filled silicone rubber is not beneficially affected by the incorporation of zinc oxide in the catalytic amounts employed.

A formulation similar to that employed in sample C was made with the exception that one part zinc oxide was substituted for two parts zinc oxide. This formulation was compounded and molded similarly as was done above, and after heat treatment at 300° F. for 1 hour the sample had a tensile strength of 1020 p. s. i. and a percent elongation of about 910. The sample was then heated for 24 hours at 480° F. and the sample tested for moisture absorption by immersing it in water at a temperature of about 158° F. for 168 hours. At the end of this time, the sample had absorbed 17.0 mgs. water/sq. in. of surface area. When sample A above was tested in the same way after the 480° F. heating, it absorbed about 225 mgs. water/sq. in. of surface area.

Table I

| Ingredients, Parts: | A[1] | B | C | D |
|---|---|---|---|---|
| Polydimethylsiloxane | 100 | 100 | 100 | 100 |
| Gamma Alumina (Alon I) | | 50 | 50 | 75 |
| Silica Aerogel (Santocel CS) | 45 | | | |
| Benzoyl Peroxide | 1.65 | 3 | 3 | 4.5 |
| Zinc Oxide | | | 2 | 3 |
| Physical Properties After 1 Hour at 300° F.: | | | | |
| Tensile, p. s. i | 760 | 960 | 1,225 | 955 |
| Percent Elongation | 300 | 600 | 980 | 680 |
| Tear Strength, lbs./inch | 70 | 80 | 115 | 220 |
| Tensile[2] Product×10⁻³ | 228 | 578 | 1,200 | 648 |
| Physical Properties After 24 hrs. at 480° F.: | | | | |
| Tensile, p. s. i | 740 | 720 | 945 | 600 |
| Percent Elongation | 270 | 400 | 660 | 300 |
| Tear strength, lbs./inch | 70 | 60 | 60 | 60 |
| Tensile Product×10⁻³ | 200 | 289 | 623 | 180 |

[1] This is a formulation which has been determined to have the optimum balance of tensile strength and elongation.
[2] Tensile product or tensile efficiency is equal to the tensile strength multiplied by the percent elongation.

When sample B was heated for 68 hours at 600° F., it was found that at the end of this time the sample was flexible and could be bent 180° without cracking. In contrast to this, when sample A was heated at this temperature for the same length of time, it was brittle and readily broke when bent.

EXAMPLE 2

In this example the gamma aluminum oxide employed in Example 1 was mixed with a convertible organopolysiloxane comprising polymeric dimethylsiloxane containing approximately 5 mol percent copolymerized diphenylsiloxane. Such a product can be obtained by cohydrolyzing dimethyldichlorosilane and diphenyldichlorosilane in the proper molar concentrations and thereafter condensing the cohydrolysis product with an alkaline condensing agent to the desired molecular weight. Alternatively, octamethylcyclotetrasiloxane and hexaphenylcyclotrisiloxane can be intercondensed with alkaline condensation catalysts to give convertible organopolysiloxanes of the type employed in the present example. The above-described convertible organopolysiloxane, for brevity hereinafter referred to as "polymethylphenylsiloxane" was mixed with gamma alumina and silica aerogel, molded and tested in the same manner as described in Example 1. The particular formulations employed as well as the test results are found described in Table II below.

Table II

| Ingredients, Parts: | E | F |
|---|---|---|
| Polymethylphenylsiloxane | 100 | 100 |
| Gamma Alumina | 50 | |
| Silica Aerogel (Santocel CS) | | 45 |
| Benzoyl Peroxide | 3 | 1.65 |
| Zinc Oxide | 5 | |
| Physical Properties After 1 Hour at 300° F.: | | |
| Tensile, p. s. i | 770 | 840 |
| Percent Elongation | 920 | 185 |
| Physical Properties After 24 Hours at 480° F.: | | |
| Tensile, p. s. i | 870 | 705 |
| Percent Elongation | 450 | 125 |

The formulation for sample F, which contains silica aerogel as a filler, has been determined by tests to constitute the optimum balance between tensile strength and elongation of this particular type of silicone rubber containing silica aerogel as the filler.

EXAMPLE 3

As pointed out previously, various types of aluminum oxides, other than the gamma aluminum oxide, have been disclosed previously as fillers for convertible organopolysiloxanes. The following example illustrates the improvement in properties obtainable by using gamma alumina over many of these aluminum oxides disclosed previously. One of the sample formulations described below includes the use of alpha alumina as a filler in order to show the marked difference in properties in employing the gamma alumina over the alpha alumina as fillers. Each set of ingredients was compounded, molded, and tested similarly as was described in Example 1 employing the same polydimethylsiloxane described in the latter example. Table III below shows the formulations and test results in each case.

Table III

| Ingredients, Parts: | G | H | I | J | K |
|---|---|---|---|---|---|
| Polydimethylsiloxane | 100 | 100 | 100 | 100 | 100 |
| Benzoyl Peroxide | 3 | 3 | 3 | 3 | 6 |
| Zinc Oxide | 2 | 2 | | | |
| Gamma Alumina (Alon I) | 50 | | | | |
| Hydrated Aluminum Oxide (C-730)[1] | | | 50 | | |
| Activated (Dehydrated) Aluminum Oxide[2] | | | | 100 | |
| Activated (Dehydrated) Aluminum Oxide[3] | | | | | |
| Alpha Alumina[4] | | 50 | | | 100 |
| Physical Properties After 1 Hour at 300° F.: | | | | | |
| Tensile, p. s. i | 1,225 | 260 | 150 | No cure | No cure. |
| Percent Elongation | 980 | 300 | 210 | do | Do. |
| Physical Properties After 24 Hours at 480° F.: | | | | | |
| Tensile, p. s. i | 720 | 265 | Rubber Blown up | do | Do. |
| Percent Elongation | 400 | 210 | do | do | Do. |

[1] Made by Aluminum Company of America and comprises 34.7 percent combined water and 64.4 percent Al₂O₃, (chemically is aluminum trihydrate), and is of an average particle size of about 0.5 micron. Used as reinforcing pigment for butadiene rubbers.
[2] Dehydrated C-730 obtained by heating for 64 hours at 480° F. to remove 28 percent of the combined water.
[3] Dehydrated C-730 by calcining at elevated temperatures to remove essentially all the combined water.
[4] Made by Linde Air Products Company, average particle size about 0.3 micron.

From the above described Table III, it will be clearly apparent that the aluminum oxides described previously for use as fillers in silicone rubber, e. g., hydrated aluminum oxide and dehydrated aluminum oxide, are not equivalent to gamma alumina employed as a filler for silicone rubber.

In addition to employing the gamma alumina as the sole filler for convertible organopolysiloxanes, advantage can be derived by including with the gamma alumina other fillers usually employed in making silicone rubber products. Thus, I have found that I may incorporate, by weight, for each part of gamma alumina, from about 0.01 to 1.5 or more parts of other fillers. Although the properties obtained by mixing other fillers with gamma alumina are not as outstanding as those products containing gamma alumina as the sole filler, nevertheless, the properties are improved, and such improvement may recommend their use in many applications where such properties are adequate for the purpose. In addition, mixtures of fillers of the type described above may be attractive because of the reduction in cost of the cured products which may be realized.

EXAMPLE 4

In this example fillers normally employed in combination with convertible organopolysiloxane were mixed in varying proportions with gamma alumina using the polydimethylsiloxane described in Example 1 as the convertible organopolysiloxane. The compounding of the ingredients, molding and testing of the products were identical with the techniques described in Example 1. The following Table IV shows the particular formulations employed, and the test results in each case.

*Table IV*

|  | Sample Number | | | |
|---|---|---|---|---|
|  | L | M | N | O |
| Ingredients, Parts: | | | | |
| Polydimethylsiloxane | 100 | 100 | 100 | 100 |
| Gamma Alumina | 50 | 50 | 50 | 50 |
| Benzoyl Peroxide | 3 | 3 | 3 | 3 |
| Zinc Oxide | 2 | 2 | 2 | 2 |
| Silica Aerogel (Santocel CS) | | 35 | | |
| Diatomaceous silica | | | 25 | 25 |
| Finely divided calcium carbonate | 15 | | | |
| Red Iron Oxide | | | | 10 |
| Physical Properties After 1 Hour at 300° F.: | | | | |
| Tensile, p. s. i | 940 | 730 | 820 | 835 |
| Percent Elongation | 790 | 440 | 550 | 570 |
| Physical Properties After 24 Hours at 480° F.: | | | | |
| Tensile, p. s. i | 805 | 735 | 700 | 690 |
| Percent Elongation | 570 | 130 | 310 | 300 |
| Tear Strength, lbs./inch | 80 | 105 | 50 | 55 |

It will of course be apparent to those skilled in the art that the amount of gamma alumina which may be employed as a filler in combination with the convertible organopolysiloxanes may be varied and, on a weight basis, may comprise from about 0.1 to 2 parts, preferably from about 0.25 to 1.25 parts, of gamma alumina per part of convertible organopolysiloxane. Obviously other fillers may be employed in combination with the gamma alumina in addition to those recited in the previous examples, for instance, talc, lithopone, carbon black, etc.

Other curing agents in addition to the benzoyl peroxide employed in the foregoing examples may be used without departing from the scope of the invention. Among such curing agents may be mentioned tertiary butyl perbenzoate, zirconyl nitrate, boron hydrides, etc. The amount of curing agent which may be used may vary widely and has been found to be advantageously in the range of from about 0.1 to about 8 percent, preferably from about 2 to 6 percent, by weight, based on the weight of the convertible organopolysiloxane. Larger amounts of the curing agent may also be employed where the application recommends such increase of curing agent.

Generally, the amount of zinc oxide which may be employed in combination with the curing agent, the convertible organopolysiloxane, and the gamma alumina, is preferably varied from about 0.1 to about 5 percent, by weight, based on the weight of the convertible organopolysiloxane. Further modification of the amounts of zinc oxide may be made taking into consideration the amount of gamma alumina used, the amount of curing agent employed, the particular application involved, etc. I have used with good results amounts as high as 20 percent, by weight, of the zinc oxide based on the weight of the convertible organopolysiloxane, for instance, convertible methylpolysiloxane. However, in the higher ranges, for instance, amounts above 5 to 10 percent, the zinc oxide appears to lower physical strength properties of the cured organopolysiloxanes. The presence of the zinc oxide does assist apparently in improving these properties when lower concentrations of the zinc oxide are employed.

It will of course be apparent to those skilled in the art that the gamma alumina filler may be employed in combination with other organopolysiloxanes, many examples of which have been given previously in the preceding examples and in the patents referred to previously. The presence of copolymerized monocyclic aryl siloxanes, for example, copolymerized diphenyl siloxane or copolymerized methyl phenyl siloxane, imparts improved low temperature flexibility to the silicone rubber.

The cured, solid, elastic organopolysiloxanes prepared and vulcanized or cured in accordance with the present invention are capable of withstanding elevated temperatures (300° to 600° F.) for extended periods of time, and also retain their desirable rubbery properties at temperatures as low as −120° F. The high temperature resistance of these materials makes them admirably suited for applications requiring resistance at higher temperatures and for longer periods of time than has heretofore been found possible using other reinforcing fillers like silica aerogel. The range of properties described above makes the cured organopolysiloxanes herein described highly useful as insulation materials for electrical conductors, gasket materials, shock absorbers, and for various applications where other natural or synthetic rubbers have heretofore been employed where it is desired to take advantage of the high temperature resistance and the low temperature flexibility of the claimed organopolysiloxanes.

What I claim as new and desire to secure by Letters Patent of the United States is:

1. A cured, solid, elastic hydrocarbon-substituted polysiloxane containing an average of from 1.95 to 2.25 hydrocarbon groups per silicon atom containing as a filler a finely divided gamma alumina of average particle size less than 100 millimicrons in which the filler is present, by weight, in an amount equal to from 0.1 to 2 parts of the latter per part of hydrocarbon-substituted polysiloxane.

2. A cured, solid, elastic product obtained by heating a mixture of ingredients comprising (1)

a hydrocarbon-substituted polysiloxane containing an average of from 1.95 to 2.25 hydrocarbon groups per silicon atom, (2) a curing agent for (1), and (3) a filler for (1) comprising gamma alumina of average particle size less than 100 millimicrons in which the filler is present, by weight, in an amount equal to from 0.1 to 2 parts of the latter per part of the hydrocarbon-substituted polysiloxane.

3. A cured, solid, elastic product obtained by heating a mixture of ingredients comprising (1) a hydrocarbon-substituted polysiloxane containing an average of from 1.95 to 2.25 hydrocarbon groups per silicon atom, (2) a curing agent for (1), (3) a filler for (1) comprising gamma alumina of average particle size less than 100 millimicrons in which the filler is present, by weight, in an amount equal to from 0.1 to 2 parts of the latter per part of the convertible hydrocarbon-substituted polysiloxane, and (4) from 0.1 to 5 per cent, by weight, zinc oxide, based on the weight of the hydrocarbon-substituted polysiloxane.

4. A cured, solid, elastic product obtained by heating a mixture of ingredients comprising (1) a methylpolysiloxane containing an average of from about 1.95 to 2.25 methyl groups per silicon atom, (2) a curing agent for (1), and (3) a filler for (1) comprising gamma alumina of average particle size less than 100 millimicrons in which the filler is present, by weight, in an amount equal to from 0.1 to 2 parts of the latter per part of the methylpolysiloxane.

5. A composition as in claim 4 in which the curing agent is benzoyl peroxide.

6. A cured, solid, elastic product obtained by heating a mixture of ingredients comprising (1) a methyl phenylpolysiloxane containing an average of from 1.95 to 2.25 total methyl and phenyl groups per silicon atom, (2) a curing agent for (1), and (3) a filler for (1) comprising gamma alumina of average particle size less than 100 millimicrons in which the filler is present, by weight, in an amount equal to from 0.1 to 2 parts of the latter per part of the methyl phenylpolysiloxane.

7. A composition as in claim 6 in which the curing agent is benzoyl peroxide.

8. A cured, solid, elastic product obtained by heating a mixture of ingredients comprising (1) a methylpolysiloxane containing an average of from about 1.95 to 2.25 methyl groups per silicon atom, (2) a curing agent for (1), (3) a filler for (1) comprising gamma alumina of average particle size less than 100 millimicrons in which the filler is present, by weight, in an amount equal to from 0.1 to 2 parts of the latter per part of the methylpolysiloxane, and (4) from 0.1 to 5 per cent, by weight, zinc oxide, based on the weight of the aforesaid methylpolysiloxane.

RICHARD M. SAVAGE.

References Cited in the file of this patent

UNITED STATES PATENTS

| Number | Name | Date |
|---|---|---|
| 2,389,491 | Dunlap et al. | Nov. 20, 1945 |
| 2,428,608 | Bass | Oct. 7, 1947 |
| 2,541,642 | Downs et al. | Feb. 13, 1951 |
| 2,559,122 | Hessel et al. | July 3, 1951 |

OTHER REFERENCES

Spencer et al.: Industrial Engineering Chem., 45, 1297 to 1304 (June 1953).

Jellinek et al.: Industrial Engineering Chem., February 1945, pages 158 to 163.